(12) United States Patent
Kuscher et al.

(10) Patent No.: US 9,519,395 B1
(45) Date of Patent: Dec. 13, 2016

(54) PRESENTING WINDOWS OR TABS

(71) Applicant: Google Inc., Mountain View, CA (US)

(72) Inventors: Alexander Friedrich Kuscher, San Francisco, CA (US); John Nicholas Jitkoff, Palo Alto, CA (US); Stefan Kuhne, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 324 days.

(21) Appl. No.: 14/062,615

(22) Filed: Oct. 24, 2013

(51) Int. Cl.
*G06F 3/048* (2013.01)
*G06F 3/0481* (2013.01)

(52) U.S. Cl.
CPC .................................. *G06F 3/0481* (2013.01)

(58) Field of Classification Search
CPC ...................................................... G06F 3/048
See application file for complete search history.

(56) References Cited

U.S. PATENT DOCUMENTS

| | | | |
|---|---|---|---|
| 9,146,651 B1* | 9/2015 | Wick et al. | G06F 3/048 |
| 2002/0093537 A1* | 7/2002 | Bocioned | G06F 3/0483 |
| | | | 715/777 |
| 2004/0125149 A1* | 7/2004 | Lapidous | G06F 3/0481 |
| | | | 715/808 |
| 2006/0230356 A1* | 10/2006 | Sauve | G06F 3/0481 |
| | | | 715/777 |
| 2010/0313156 A1* | 12/2010 | Louch | G06F 3/0481 |
| | | | 715/769 |

* cited by examiner

*Primary Examiner* — Peiyong Weng
(74) *Attorney, Agent, or Firm* — McDermott Will & Emery LLP

(57) ABSTRACT

Systems and methods for presenting windows or tabs are provided. In some aspects, a request is received, via a user input device, to view a set of windows or tabs that are open at a computing device and associated with a first application. A representation of a first set of windows or tabs is presented via a display device, the first set of windows or tabs including windows or tabs opened with the first application. A representation of a second set of windows or tabs is presented, via the display device, in conjunction with the first set of windows or tabs, the second set of windows or tabs including windows or tabs having address information associated with the first application and being opened with a second application different from the first application.

21 Claims, 4 Drawing Sheets

PRESENTING WINDOWS OR TABS

BACKGROUND

The subject technology is generally directed to user interfaces for computing devices.

Often times, users of computing devices have multiple open windows and multiple open tabs within the windows. In some cases, various windows or various tabs in different windows may form a logical set. For example, an online document opened in an online document processor may be in a logical set with a local document, stored at the computing device, opened with a local document processor. However, there is no representation of this logical set at the computing device.

SUMMARY

In some aspects, the disclosed subject matter relates to a computer-implemented method for presenting a set of windows or tabs associated with an application. The method includes receiving, via a user input device, a request to view a set of windows or tabs that are open at a computing device and associated with a first application. The method includes presenting, via a display device, a representation of a first set of windows or tabs, the first set of windows or tabs including windows or tabs opened with the first application. The method includes presenting, via the display device, a representation of a second set of windows or tabs in conjunction with the first set of windows or tabs, the second set of windows or tabs including windows or tabs having address information associated with the first application and being opened with a second application different from the first application.

In some aspects, the disclosed subject matter relates to a non-transitory computer-readable medium encoded with executable instructions. The instructions include code for receiving a request to view a set of windows or tabs that are open at the computer and associated with a first application. The instructions include code for presenting a representation of a first set of windows or tabs, the first set of windows or tabs including windows or tabs opened with the first application. The instructions include code for presenting a representation of a second set of windows or tabs in conjunction with the first set of windows or tabs, the second set of windows or tabs including windows or tabs having address information associated with the first application and being opened with a second application different from the first application.

In some aspects, the disclosed subject matter relates to a system. The system includes one or more processors and a memory. The memory includes instructions. The instructions include code for receiving, via a user input device, a request to view a set of tabs that are open at the computing device and associated with a first application. The instructions include code for presenting, via a display device, a representation of a first set of tabs, the first set of tabs including tabs opened in a window associated with the first application. The instructions include code for presenting, via the display device, a representation of a second set of tabs in conjunction with the first set of tabs, the second set of tabs including tabs having address information associated with the first application and being opened in a window associated with a second application different from the first application.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

Figure 1:
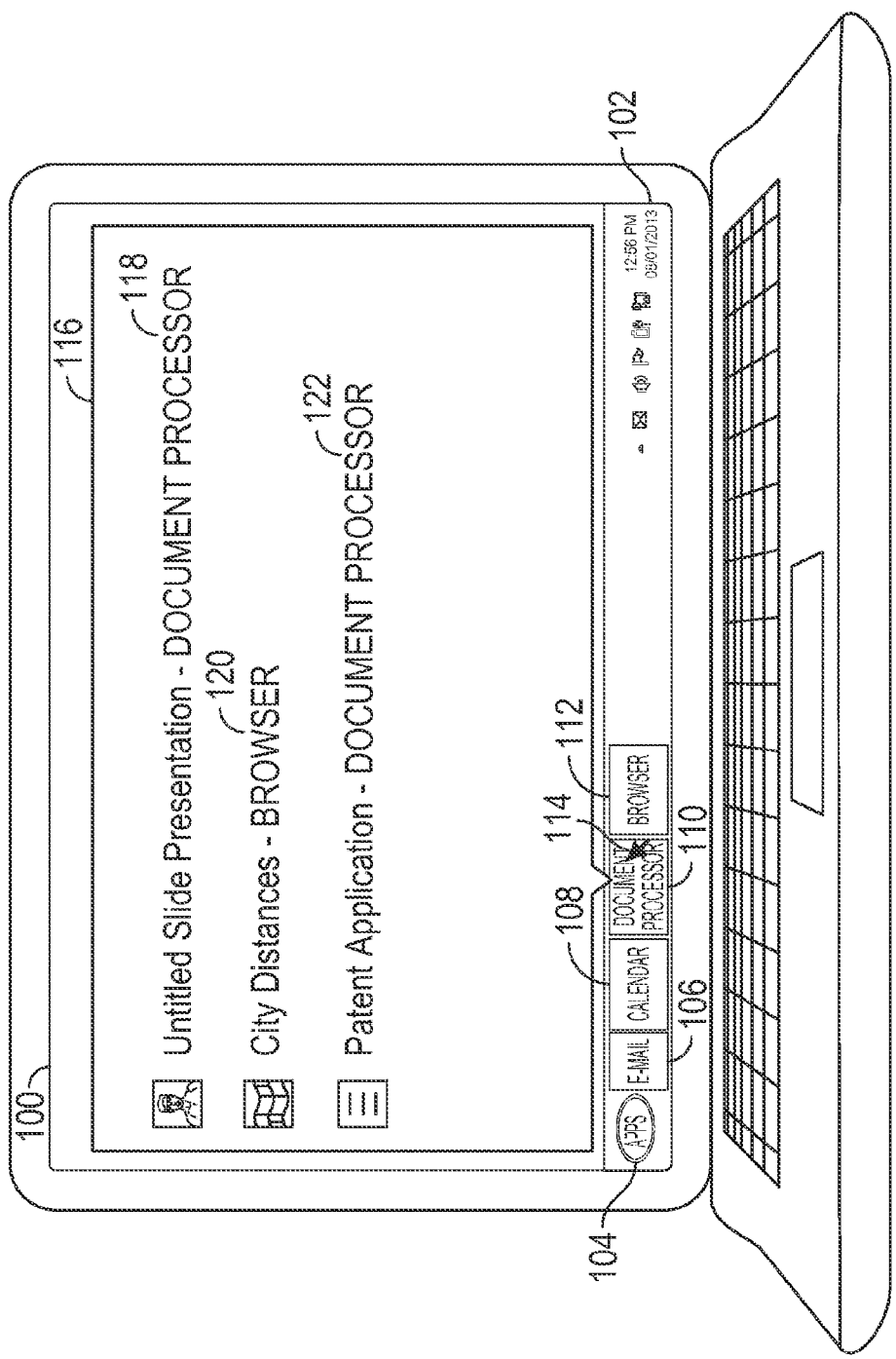
FIG. 1 illustrates an example interface for presenting windows and tabs.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, certain structures and components are shown in block diagram form in order to avoid obscuring the concepts of the subject technology.

The subject technology provides techniques for presenting windows or tabs. According to some implementations, a computing device receives, via a user input device, a request to view a set of windows or tabs that are open at the computing device and associated with a first application (e.g., a document processor application). For example, an icon corresponding to the first application on a toolbar of the computing device may be selected via a touch or cursor interface or a mouse may be hovered over the icon. The computing device presents, via a display device, a representation of a first set of windows or tabs. The first set of windows or tabs includes windows or tabs opened with the first application. The computing device presents, via the display device, a representation of a second set of windows or tabs in conjunction with the representation of the first set of windows or tabs. The second set of windows or tabs includes window or tabs having address information associated with the first application and being opened with a second application (e.g., a web browser application) different from the first application. The representations of the first set and the second set may be interspersed with one another.

The address information associated with the first application may include a uniform resource locator (URL) pattern associated with the first application. For example, a document processor application may have the URL pattern *.documents.example.com*. A specific document, whether stored locally or online as an online document, may have the URL x3jre.documents.example.com/fxza2, where the URL pattern "documents.example.com" is a substring of the URL of the document "x3jre.documents.example.com/fxza2." In addition, some preinstalled or installed applications may be grouped together. For example, several running calculators may be grouped together, or a web browser item may collect all running web browsers.

As used herein, applications include, among other things, native applications, web applications, and packaged applications. A native application may include an application program that has been developed for use on a particular platform or device. A web application may include an application that may use a web browser and may be written in a web browser supported programming language (e.g., JavaScript, or Hypertext Markup Language). A packaged application may deliver an experience as capable as a native application, while being safe for the client operating system, as a web page. Similarly to a web application, a packaged application may be written in a web browser supported programming language. However, a packaged application may look and behave like a native application, and may have native-like capabilities that are much more powerful than those available to web applications.

FIG. 1 illustrates an example interface 100 for presenting windows or tabs. The interface 100 includes a toolbar 102, a cursor 114, and a pop-up bubble 116.

The toolbar 102 includes an apps button 104 and buttons 106, 108, 110, and 112 corresponding to applications that may execute using the interface 100, specifically an email application button 106, a calendar application button 108, a document processor application 110, and a web browser application 112. The apps button 104, when selected, may cause the interface 100 to present one or more applications that may execute within the interface 100. In some implementations, the apps button 104 may be absent or may be replaced with another button, for example, a start button. As shown, the user is hovering the cursor 114 over the document processor application button 110. In response to hovering the cursor 114 over the document processor application button 110, the pop-up bubble 116 appears in the interface 100. Alternatively, on a touchscreen implementation, the pop-up bubble 116 may appear in the interface 100 in response to the user touching the document processor application button 110 and/or touching and holding a touching device (e.g., a finger or a stylus) at the document processor application button 110 for at least a predetermined time period (e.g., 1 second, 2 seconds, etc.).

The pop-up bubble 116 includes representations of windows or tabs that are associated with the document processor application 110—"Untitled Slide Presentation" 118, "City Distances" 120, and "Patent Application" 122. Each of the representations of windows or tabs indicates an application in which the window or tab is open. As shown, "Untitled Slide Presentation" 118 and "Patent Application" 122 are open with the document processor application, and "City Distances" 120 is open with the web browser application. While "City Distances" 120 is not open with the document processor application, "City Distances" 120 is associated with the document processor application, for example, based on a URL pattern of the document processor application being a substring of a URL corresponding to the "City Distance" 120 window or tab. In some examples, one or more of the representations 118, 120, or 122 of open windows or tabs may be marked with a user status symbol. The user status symbol may indicate whether the open window or tab is an incognito window or tab. In a multi-user environment, the user status symbol may indicate the identity of the user who owns or is accessing the content of the window or tab.

Examples of the subject technology are described in FIG. 1 using an interface 100 of a laptop computer having a cursor 114. However, the subject technology may be implemented on any computing device, not necessarily a laptop computer. For instance, the subject technology may be implemented using a desktop computer, a tablet computer, a mobile phone, a personal digital assistant (PDA), an electronic music player, a smart watch, a television coupled with one or more processors and a memory, etc. Also, the subject technology may be implemented with any user input device, not necessarily a cursor or a mouse. For instance, implementation(s) of the subject technology may operate in conjunction with a touchscreen or a joystick.

Figure 2:
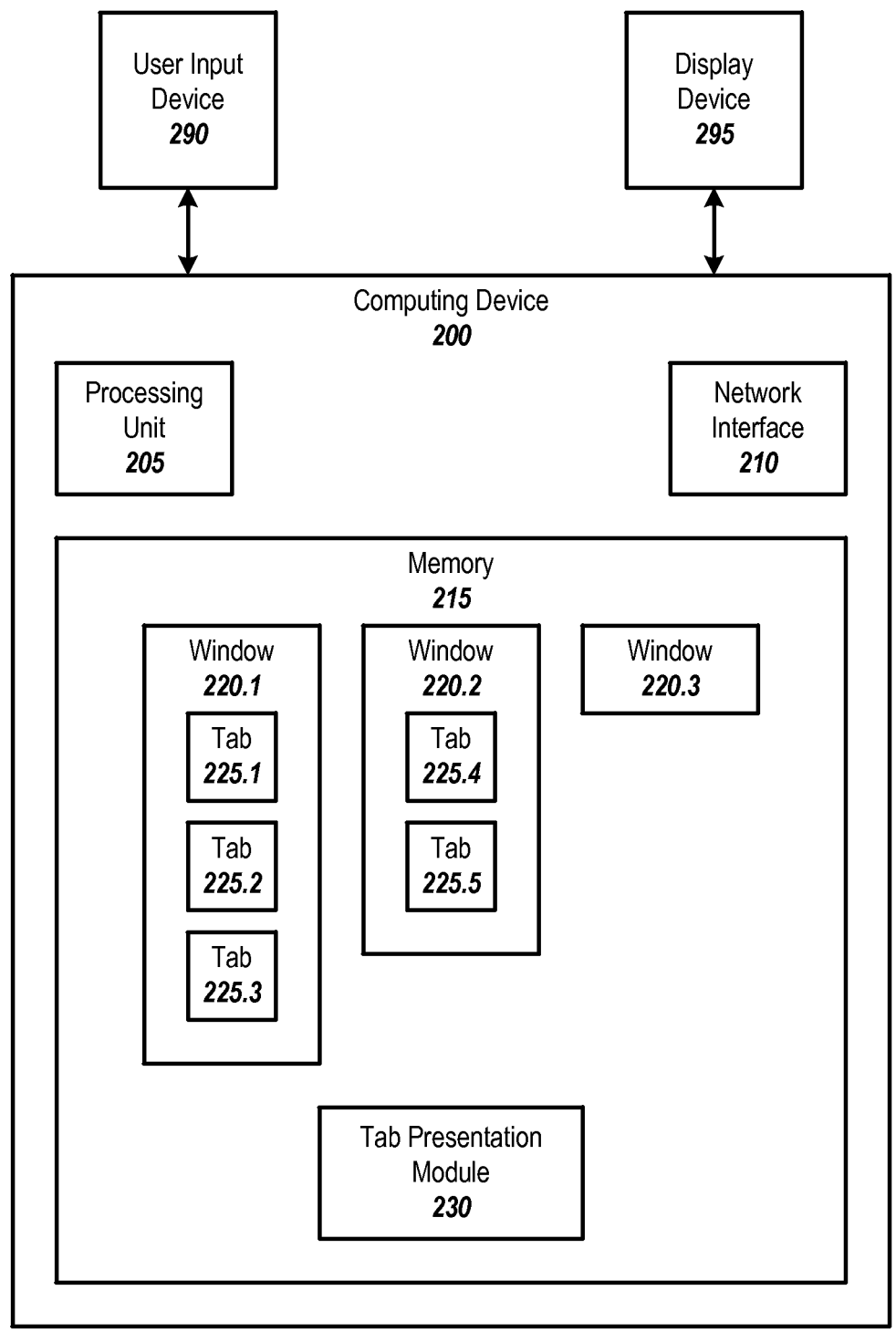
FIG. 2 illustrates an example computing device programmed to present windows and tabs.

FIG. 2 illustrates an example computing device 200 programmed to present windows and tabs. The computing device 200 may be a laptop computer, a desktop computer, a tablet computer, a mobile phone, a personal digital assistant (PDA), an electronic music player, a smart watch, a television coupled with one or more processors and a memory, etc. As shown, the computing device 200 is coupled with a user input device 290 and a display device 295. The user input device 290 may be a mouse, a joystick, a touching device, etc. The display device 295 may be a monitor, a screen, a projector, etc. As shown, the user input device 290 and the display device 295 are external to the computing device 200. However, one or both of the user input device 290 and the display device 295 may be components of the computing device 200.

As shown, the computing device 200 includes a processing unit 205, a network interface 210, and a memory 215. The processing unit 205 includes one or more processors. The processing unit 205 may include a central processing unit (CPU), a graphics processing unit (GPU), or any other processing unit. The processing unit 205 executes computer instructions that are stored in a computer-readable medium, for example, the memory 215. The network interface 210 allows the computing device 200 to transmit and receive data in the network. The memory 215 stores data and/or instructions. The memory 215 may be one or more of a cache unit, a storage unit, an internal memory unit, or an external memory unit. As illustrated, the memory 215 includes windows 220.1-3 and a tab presentation module 230.

As shown, the computing device 200 includes three open windows 220.1-3. However, the computing device 200 may include any number of windows. Some of the windows may include one or more open tabs. For example, as shown, window 220.1 includes tabs 225.1-3 and window 220.2 includes tabs 225.4-5. Window 220.3 does not include any tabs. In some cases, a window may include a single open tab or any number of open tabs.

As used herein, the term "tab" encompasses its plain and ordinary meaning. For example, a tab may be a "window within a window," or a part of a window devoted to a particular file. For example, a web browser window may include a first tab displaying the webpage example.com and a second tab displaying the webpage search-engine.com. Similarly, a document processor application may include one or more tabs, with each tab including a document being reviewed or edited using the document processor application. Some files may be capable of being opened as tabs in windows of multiple different applications. For example, a hypertext markup language (HTML) file stored locally at the computing device 200 may be capable of being opened for display as a tab in the web browser and capable of being opened for review or editing as a tab in the document processor application.

The memory 215 of the computing device 200 includes the tab presentation module 230. The tab presentation module 230, when executed by the processing unit 205, causes the processing unit 205 to receive, via the user input device 290, a request to view a set of tabs (e.g., one or more of the tabs 225.1-5) that are open at the computing device 200 and associated with a first application (e.g., an email application associated with email application window 220.2). The tab presentation module 230 causes the processing unit 205 to present, via the display device 295, a representation of a first set of tabs. The first set of tabs includes tabs opened in a window associated with the first application (e.g., tabs 225.4 and 225.5 open in the window 220.2 associated with the email application window 220.2). The tab presentation module 230 causes the processing unit 205 to present, via the display device 295, a representation of a second set of tabs in conjunction with the representation of the first set of tabs. The second set of tabs includes tabs having address information associated with the first application and being opened in a window associated with a second application different from the first application (e.g., window 220.1 or window 220.3, which may correspond to a web browser application, a document processor application, etc.).

The address information associated with the first application may correspond to a URL pattern associated with a middle part of an address of a tab. For example, an email application may have the URL pattern *.email.example-.com* and an example file associated with the email application may have the URL gx7er.email.example.com/w24zj. The URL pattern is a substring of the URL of the file and may be in the middle of the URL of the file. In other words, in the URL of the file, at least one additional character may appear to the left of the URL pattern and at least one additional character may appear to the right of the URL pattern.

In some cases, the processing unit 205, when executing the tab presentation module 230, may determine, based on a URL address of a specified tab opened in the window associated with the second application, whether the specified tab is in the second set of tabs. For instance, the specified tab may be in the second set of tabs if the URL pattern for the first application is a substring of the URL of the specified tab.

Figure 3:
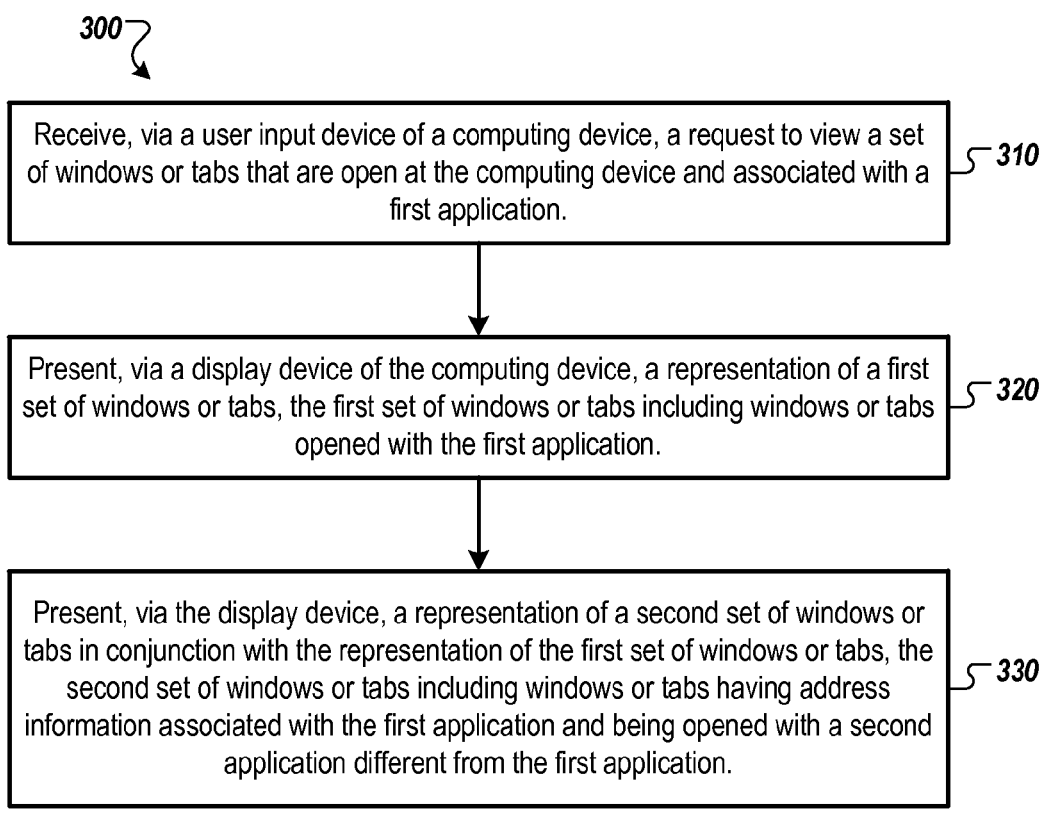
FIG. 3 illustrates an example process by which windows and tabs may be presented.

FIG. 3 illustrates an example process 300 by which windows and tabs may be presented.

As shown, the process 300 begins at step 310, where a computing device (e.g., computing device 200) receives, via a user input device (e.g., user input device 290) of the computing device, a request to view a set of windows or tabs that are open at the computing device and associated with a first application. The user may operate the user input device to select an icon corresponding to the application on a toolbar (e.g., toolbar 102) of the computing device. For example, as shown in FIG. 1, the user may hover a cursor (e.g., cursor 114) over an icon (e.g., button 110) for the first application on the toolbar of the computing device and the computing device may receive an indication of the hovering of the cursor. Alternatively, on a computing device having a touchscreen, the user may touch and hold, for at least a predetermined time period (e.g., 1 second, 2 seconds, etc.), a touching device (e.g., a finger or a stylus) over an icon (e.g., a button) corresponding to the first application on a toolbar of the computing device and the computing device may receive an indication of the touching and holding.

In step 320, the computing device presents, via a display device (e.g., display device 295) of the computing device, a representation of a first set of windows or tabs. The first set of windows or tabs includes windows or tabs opened with the first application. For example, as shown in FIG. 1, the first application is the document processor application and the files called "Untitled Slide Presentation" 118 and "Patent Application" 122 are opened in window(s) or tab(s) of the first application (e.g., the document processor application). In some examples, the first set of windows or tabs includes a first tab from a first window of the first application and a second tab from a second window of the first application. The first window includes multiple tabs, and the second window includes multiple tabs. The first window is different from the second window.

In step 330, the computing device presents, via the display device, a representation of a second set of windows or tabs in conjunction with the representation of the first set of windows or tabs. The second set of windows or tabs include window or tabs having address information associated with the first application (e.g., document processor application) and being opened with a second application (e.g., web browser application, email application, etc.) different from the first application. For example, as shown in FIG. 1, the first application is the document processor application and the file called "City Distances" 120 is opened in the web browser but has address information (e.g., URL information) associated with the document processor application.

When displayed on the display device, the first set of windows or tabs may be interspersed with the second set of windows or tabs. For example, as shown in FIG. 1, window or tab 120 from the second set is placed in between window or tab 118 from the first set and window or tab 122 from the first set. After step 330, the process 300 ends.

As illustrated in FIG. 3, the steps 310-330 of the process 300 are carried out in series and according to a specified order. However, the steps 310-330 of the process 300 may be carried out in any order. In some implementations, two or more of the steps 310-330 of the process 300 may be carried out in parallel.

Figure 4:
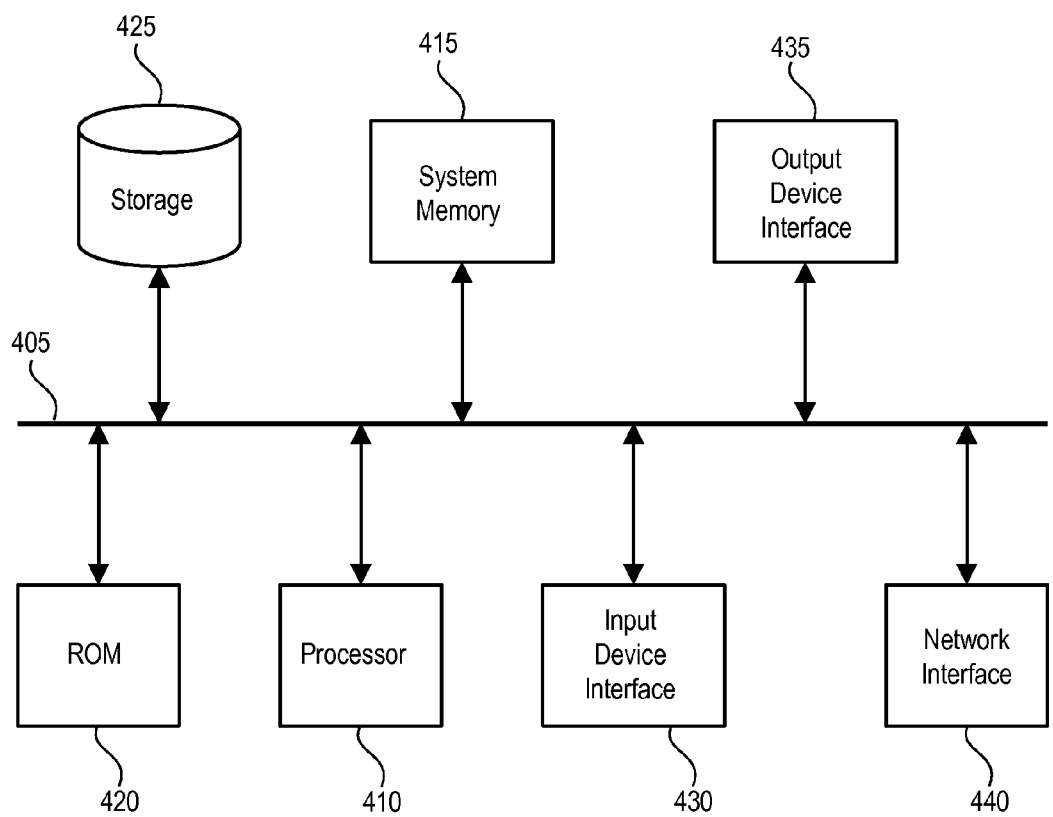
FIG. 4 conceptually illustrates an example electronic system with which some implementations of the subject technology are implemented.

FIG. 4 conceptually illustrates an electronic system 400 with which some implementations of the subject technology are implemented. For example, the computing device 200 may be implemented using the arrangement of the electronic system 400. The electronic system 400 can be a computer (e.g., a mobile phone, PDA), or any other sort of electronic device. Such an electronic system includes various types of computer readable media and interfaces for various other types of computer readable media. Electronic system 400 includes a bus 405, processing unit(s) 410, a system memory 415, a read-only memory 420, a permanent storage device 425, an input device interface 430, an output device interface 435, and a network interface 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425.

From these various memory units, the processing unit(s) 410 retrieves instructions to execute and data to process in order to execute the processes of the subject technology. The processing unit(s) can be a single processor or a multi-core processor in different implementations.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some implementations of the subject technology use a mass-storage device (for example a magnetic or optical disk and its corresponding disk drive) as the permanent storage device 425.

Other implementations use a removable storage device (for example a floppy disk, flash drive, and its corresponding disk drive) as the permanent storage device 425. Like the permanent storage device 425, the system memory 415 is a read-and-write memory device. However, unlike storage device 425, the system memory 415 is a volatile read-and-write memory, such a random access memory. The system memory 415 stores some of the instructions and data that the processor needs at runtime. In some implementations, the processes of the subject technology are stored in the system memory 415, the permanent storage device 425, or the read-only memory 420. For example, the various memory units include instructions for presenting windows or tabs in accordance with some implementations. From these various memory units, the processing unit(s) 410 retrieves instructions to execute and data to process in order to execute the processes of some implementations.

The bus 405 also connects to the input and output device interfaces 430 and 435. The input device interface 430 enables the user to communicate information and select commands to the electronic system. Input devices used with input device interface 430 include, for example, alphanumeric keyboards and pointing devices (also called "cursor control devices"). Output device interfaces 435 enables, for example, the display of images generated by the electronic system 400. Output devices used with output device interface 435 include, for example, printers and display devices, for example cathode ray tubes (CRT) or liquid crystal displays (LCD). Some implementations include devices for example a touch screen that functions as both input and output devices.

Finally, as shown in FIG. 4, bus 405 also couples electronic system 400 to a network (not shown) through a network interface 440. In this manner, the electronic system 400 can be a part of a network of computers (for example a local area network (LAN), a wide area network (WAN), or an Intranet, or a network of networks, for example the Internet. Any or all components of electronic system 400 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A method comprising:
   receiving, via a user input device, a request to view a set of windows or tabs that are open at a computing device and associated with a first application, wherein the first application is different from a web browser;
   presenting, via a display device, first representations of a first set of windows or tabs in a window, the first set of windows or tabs comprising windows or tabs having been opened with the first application; and
   presenting, via the display device, second representations of a second set of windows or tabs in the window in conjunction with the first representations of the first set of windows or tabs, the second set of windows or tabs comprising windows or tabs associated with the first application and having been opened with the web browser, wherein the first representations of the first set of windows or tabs are interspersed within the window with the second representations of the second set of windows or tabs, and the interspersed first and second representations are presented separately from the first and second sets of windows or tabs.

2. The method of claim 1, wherein the second set of windows or tabs comprises windows or tabs having address information associated with the first application, the address information comprising a uniform resource locator (URL) pattern associated with the first application.

3. The method of claim 2, further comprising:
   determining, based on a URL address of a specified window or tab, whether the specified window or tab is in the second set of windows or tabs.

4. The method of claim 1, wherein one of the first representations of one of the first set of windows or tabs is interspersed between two of the second representations of two of the second set of windows or tabs.

5. The method of claim 1, wherein receiving the request to view the set of windows or tabs that are open at the computing device and associated with the first application comprises:
receiving a selection of an icon corresponding to the first application on a toolbar of the computing device.

6. The method of claim 1, wherein the user input device comprises a mouse for operating a cursor, and wherein receiving the request to view the set of windows or tabs that are open at the computing device and associated with the first application comprises:
receiving an indication of hovering the cursor over an icon corresponding to the first application on a toolbar of the computing device.

7. The method of claim 1, wherein the user input device comprises a touching device for operating a touchscreen, and wherein receiving the request to view the set of windows or tabs that are open at the computing device and associated with the first application comprises:
receiving an indication of touching and holding, for at least a predetermined time period, the touching device over an icon corresponding to the first application on a toolbar of the computing device.

8. The method of claim 1, wherein the first set of windows or tabs comprises a first tab from a first window of the first application and a second tab from a second window of the first application, wherein the first window comprises a first plurality of tabs, wherein the second window comprises a second plurality of tabs, and wherein the first window is different from the second window.

9. A non-transitory computer-readable medium comprising instructions which, when executed by a computer, cause the computer to implement a method, the method comprising:
receiving a request to view a set of windows or tabs that are open at the computer and associated with a first application, wherein the first application is different from a web browser;
presenting a first representation of each of a first set of windows or tabs in a list, the first set of windows or tabs comprising windows or tabs opened with the first application; and
presenting a second representation of each of a second set of windows or tabs in the list in conjunction with the first representation of each of the first set of windows or tabs, the second set of windows or tabs comprising windows or tabs associated with the first application and being opened with the web browser, and the first and second representations being distinct from the first and second sets of windows or tabs.

10. The non-transitory computer-readable medium of claim 9, wherein the second set of windows or tabs comprises windows or tabs having address information associated with the first application, the address information comprising a uniform resource locator (URL) pattern associated with the first application.

11. The non-transitory computer-readable medium of claim 10, the method further comprising:
determining, based on a URL address of a specified window or tab, whether the specified window or tab is in the second set of windows or tabs.

12. The non-transitory computer-readable medium of claim 9, wherein the first representation of one of the first set of windows or tabs is presented in the list between two second representations of two of the second set of windows or tabs.

13. The non-transitory computer-readable medium of claim 9, wherein receiving the request to view the set of windows or tabs that are open at the computer and associated with the first application comprises:
receiving a selection of an icon corresponding to the first application on a toolbar of the computer.

14. The non-transitory computer-readable medium of claim 9, wherein the request to view the set of windows or tabs that are open at the computer is received via a user input device, and wherein the user input device comprises a mouse for operating a cursor, and wherein receiving the request to view the set of windows or tabs that are open at the computer and associated with the first application comprises:
receiving an indication of hovering the cursor over an icon corresponding to the first application on a toolbar of the computer.

15. The non-transitory computer-readable medium of claim 9, wherein the request to view the set of windows or tabs that are open at the computer is received via a user input device, and wherein the user input device comprises a touching device for operating a touchscreen, and wherein receiving the request to view the set of windows or tabs that are open at the computer and associated with the first application comprises:
receiving an indication of touching and holding, for at least a predetermined time period, the touching device over an icon corresponding to the first application on a toolbar of the computer.

16. The non-transitory computer-readable medium of claim 9, wherein the first set of windows or tabs comprises a first tab from a first window of the first application and a second tab from a second window of the first application, wherein the first window comprises a first plurality of tabs, wherein the second window comprises a second plurality of tabs, and wherein the first window is different from the second window.

17. A computing device comprising:
one or more processors;
a memory comprising instructions which, when executed by the one or more processors, cause the one or more processors to implement a method, the method comprising:
receiving, via a user input device, a request to view a set of tabs that are open at the computing device and associated with a first application, wherein the first application is different from a web browser;
presenting, via a display device, a first representation of a first set of tabs in a pop-up window, the first set of tabs comprising tabs opened in a first window associated with the first application; and
presenting, via the display device, a second representation of a second set of tabs in the pop-up window in conjunction with the first representation of the first set of tabs, the second set of tabs comprising tabs associated with the first application and being opened in a second window associated with the web browser, the pop-up window being distinct from the first window and the second window, and the first and second representations being distinct from the first and second sets of tabs.

18. The computing device of claim 17, further comprising the display device.

19. The computing device of claim 17, further comprising the user input device.

20. The computing device of claim 17, wherein at least one of the display device or the user input device is external to the computing device.

21. The method of claim 1, wherein the window comprises a popup bubble.

\* \* \* \* \*